US011212362B2

(12) United States Patent
Dhara et al.

(10) Patent No.: US 11,212,362 B2
(45) Date of Patent: Dec. 28, 2021

(54) SYSTEM AND METHOD FOR AUTHORIZING THIRD PARTY PROFILE DATA SHARING

(71) Applicant: Avaya Inc., Basking Ridge, NJ (US)

(72) Inventors: Krishna Kishore Dhara, Dayton, NJ (US); Venkatesh Krishnaswamy, Holmdel, NJ (US); Xiaotao Wu, Edison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1390 days.

(21) Appl. No.: 13/728,531

(22) Filed: Dec. 27, 2012

(65) Prior Publication Data
US 2014/0188991 A1    Jul. 3, 2014

(51) Int. Cl.
*H04L 29/08* (2006.01)

(52) U.S. Cl.
CPC .................. *H04L 67/306* (2013.01)

(58) Field of Classification Search
CPC .................................................. H04L 67/306
See application file for complete search history.

(56) References Cited

U.S. PATENT DOCUMENTS

| 9,015,856 | B2* | 4/2015 | Matus | 726/28 |
| 2002/0010679 | A1* | 1/2002 | Felsher | 705/51 |
| 2004/0111360 | A1* | 6/2004 | Albanese | 705/38 |
| 2008/0155644 | A1* | 6/2008 | Baranov et al. | 726/1 |
| 2008/0256602 | A1* | 10/2008 | Pagan | H04L 51/04 726/3 |
| 2010/0169499 | A1* | 7/2010 | Ristock et al. | 709/229 |
| 2012/0203846 | A1* | 8/2012 | Hull | G06Q 10/107 709/206 |
| 2013/0198811 | A1* | 8/2013 | Yu et al. | 726/4 |
| 2014/0059125 | A1* | 2/2014 | Hillier | H04L 61/1594 709/204 |
| 2014/0067909 | A1* | 3/2014 | Johansson | G06Q 30/02 709/203 |

* cited by examiner

*Primary Examiner* — Philip J Chea
*Assistant Examiner* — Robert B McAdams
(74) *Attorney, Agent, or Firm* — Sheridan Ross P.C.

(57) ABSTRACT

Disclosed herein are systems, methods, and computer-readable storage media for authorizing third-party profile data sharing. The system receives a request to a request to share profile data held by a first person with a second person, wherein the profile data is of a third person. The system then generates a common context value based on an association between at least two of the first person, the second person, and the third person, wherein the common context value indicates how strongly the third person is connected to the first person and/or the second person. When the common context value is above a threshold, the system permits the first person to share the profile data of the third person with the second person.

20 Claims, 6 Drawing Sheets

SYSTEM AND METHOD FOR AUTHORIZING THIRD PARTY PROFILE DATA SHARING

BACKGROUND

1. Technical Field

The present disclosure relates to sharing profile data and more specifically to authorizing sharing profile data of a third party on a communication system.

2. Introduction

Advancements in the communication technology has enabled people to interact with others through a wide variety of means such as telephones, smartphones, instant messengers, teleconferencing systems, video conferencing systems, and voice over IP. The user interfaces for such devices and applications have also achieved a new height as they became more rich and intuitive. One such way to enhance the experience of communicating with others is to provide a digital directory from which a user can choose someone to talk to. These directories or contact lists often display the photos of the contacts along with their names to make it easier to identify each person as well as making the experience more aesthetically pleasing. However, any missing photos or other missing information on these contact lists such as missing phone numbers or e-mail addresses would greatly undermine the usefulness of the lists and prevent them from offering a complete picture of all the contacts and related information. For instance, modern smartphones are capable of pulling contact information from various sources, such as web-based e-mail services, social media services, and voice-over-IP services. Each contact's profile data such as name, phone number, e-mail address, profile photo, and other information are culled from multiple data sources and distilled into one consolidated listing of information.

However, even with multiple sources of information, the list is often not complete. One contact may be missing a phone number, another may be missing a photo, and yet another may have only a single e-mail address and nothing else. Filling in these gaps for every contact on the list can be a daunting task. It is conceivable that one can ask everyone personally to provide the missing information, but this can be tedious and inconvenient. Moreover, one may not even be able to reach some of her contacts because the contact list does not contain a phone number or an e-mail address for those individuals. For example, when an entry in the contact list only lists the person's name and no other information such as a phone number, an e-mail address, a home address, a picture, etc., that individual is as good as being unlisted from that contact list as far as reachability is concerned.

There may be, however, other ways to obtain the missing information. Specifically, other contacts on the list may have the information needed and be able to provide that information. For example, even if one does not have an e-mail address for his college professor, another student in his class may have the e-mail address and be willing to provide that information. There may be other concerns, however. For instance, even if another contact can provide the missing profile information, the individual whose information is missing may not approve of such sharing of information. As an illustration, Ben is a fan of a celebrity singer and song-writer Clare. Ben does not have any contact information of Clare other than her name, but he is a personal friend of Clare's agent Amy. Amy is willing to give out the phone number, the e-mail address, the home address, and several personal photos of Clare to Amy. Clare, however, is not pleased with Amy's decision. As observed in this illustration, sharing a third party's information with someone can be often tricky, especially when the third party does not have the knowledge of the proposed sharing of information.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for sharing third-party profile data. The system receives a request to share profile data held by a first person with a second person, wherein the profile data is of a third person. The profile data can include names, nicknames, titles, phone numbers, e-mail addresses, photos, avatars, dates of birth, usernames, identification numbers, and so forth. The request to share the profile data can be from the first person or the second person.

The system then generates a common context value based on an association between at least two of the first person, the second person, and the third person, wherein the common context value indicates how strongly the third person is connected to at least one of the first person and the second person. The value can apply to a connection between any two fo the first, second and third person. The association can be an interaction history and/or a relational metric. The interaction history can be based on communication threads such as e-mail messages, phone calls, face-to-face conversations, announcements, meetings, conferences, projects, trips, social events, and so forth. The relational metric can be based on familial relationships, social relationships, professional relationships, civic relationships, communal relationships, and/or other relationships.

Next, when the common context value is above a threshold, the system permits the first person to share the profile data of the third person with the second person. The threshold can be adjusted according to public availability of the profile data to be shared. For example, the system can be set up so that if the data to be shared is already available to the general public on the Internet, the authorization to share the data will be more likely to be given. In some embodiments, the system can also receive the third person's permission for the first person to share the profile data with the second person, and permit the first person to share the profile data of the third person with the second person, even when the common context value is not above the threshold.

Allowing peers to share profile data among them enhances the availability of the profile data across the entire user base and the communication system. The wide availability of the profile data, in turn, will make the communication system that more viable and useful.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The present disclosure provides a way to share profile data of a mutual contact. A system, method and computer-readable media are disclosed which evaluates user relationships and grants permission to share profile data among them. A brief introductory description of a basic general purpose system or computing device in FIG. 1 which can be employed to practice the concepts is disclosed herein. A more detailed description of receiving a request to share profile data and granting permission will then follow. These variations shall be described herein as the various embodiments are set forth. The disclosure now turns to FIG. 1.

Figure 1:
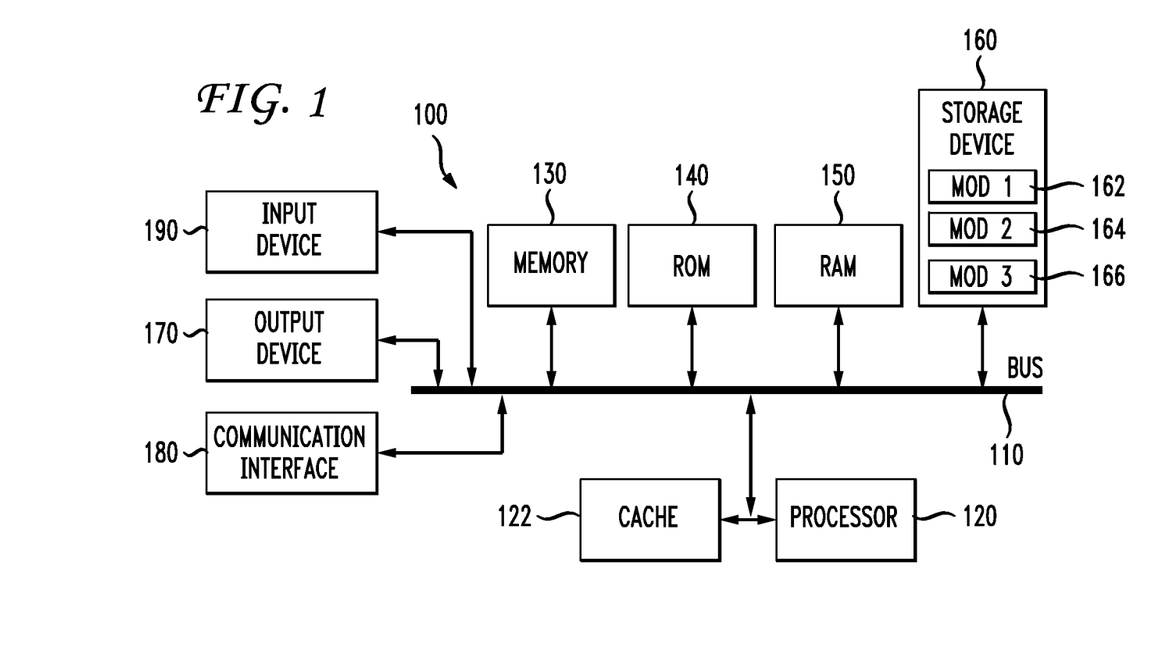
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
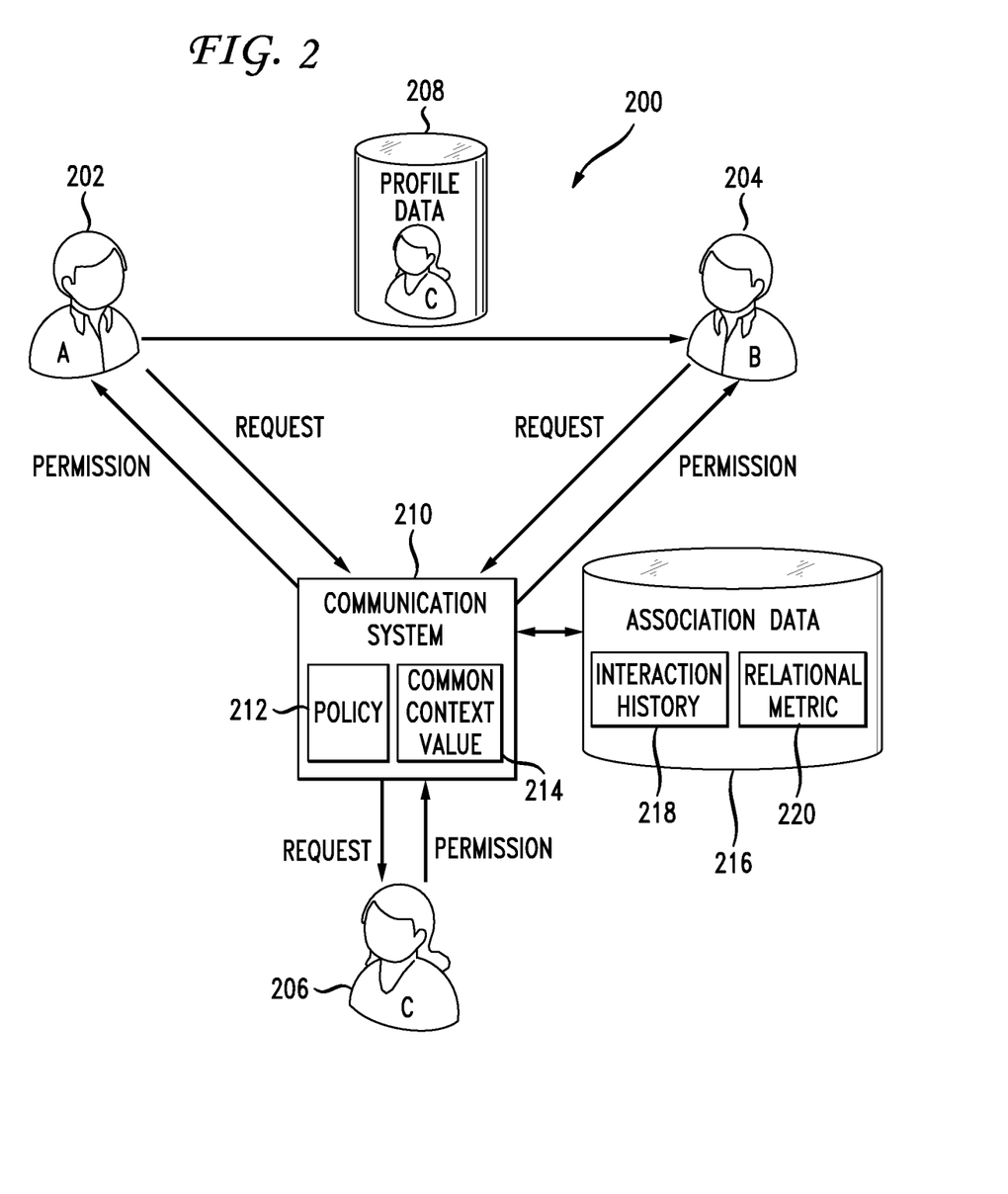
FIG. 2 illustrates an example request to share third-party profile data.

Having disclosed some components of a computing system, the disclosure now turns to FIG. 2, which illustrates an example request to share third-party profile data. The communication environment 200 consists of the communication system 210, the first person 202, the second person 204, the communication system 210, and the association data 216. The communication system 210 is any system, device, or medium that allows two or more people to communicate with each other electronically. Alternatively, the communication system 210 can be a collection of systems, devices, media, and/or networks. For example, the communication system 210 can be two or more communication devices such as mobile phones that are connected to each other in an ad-hoc wireless network. In another example, the communication system 210 can be a cellular network or the Internet with terminals such as computers and smartphones attached at its nodes. The communication system 210 may include the communications software that runs on those terminals such as computers and smartphones. Some non-limiting examples of the communication system 210 include a cellular phone, a smartphone, a computer, an instant messenger, a voice over IP (VoIP) server, a video chat/conferencing server, a teleconferencing platform, an e-mail service, a social media service, and an web-based remote conferencing platform. In some embodiments, the users of the communication system 210 can communicate with each other through text. In other embodiments, the user can communicate through audio and/or video.

To help the users identify each other, the communication system 210 makes use of profile data 208, created for each user. In some embodiments, the profile data 208 is stored in and managed by the communication system 210. In other embodiments, the profile data 208 is something that the users 202, 204, 206 themselves store on local communicating devices and the communication system 210 merely accesses and/or manages it. The profile data 208 may include such information as a name, a nickname, a title, a phone number, an address, an e-mail address, a photograph, an avatar, a date of birth, a username, an identification number such as an employee number, or any piece of information that may help identifying a person. For instance, a person's profile data may consist of his name ("John Jacobsen"), his nickname ("Johnny"), his phone number ("555-849-1138"), his home address ("221B Baker St."), his work address ("1200 Sky Ranch Rd."), his e-mail address ("jjacobsen@email.com"), his IM username ("johnny1138"), a photograph of his face, and his date of birth ("May 4, 1944"). Such information may be freely accessible to the public, or it may be given to only a few selected persons.

The communication system 210 can implement various data sharing policies regarding which information may be shared with which user(s). For example, the communication system 210 may have a policy 212 in place to allow anyone to see anyone else's name and picture, but only allow the ones who have been approved by the owner of the profile to look up the profile owner's e-mail address or phone number. Under this policy 212, if Alice has allowed Bob but not Charles to have her e-mail address, then Charles would not be able to access Alice's e-mail information although he may be able to look up her name and picture. Therefore, under this and other similar data sharing policies, the set of profile data that is available to one person can be different from the set of profile data that is available for access to another person. For instance, Alice may be able to view the full profile data of Bob, Charles, David, and Ethan, while Bob may only be able to have access to Alice's profile data and no one else's. Similarly, Charles may have access only to Bob's and David's profile information, David may be able to see only Alice's, Bob's, and Ethan's profile data, while Ethan does not have any access to anyone else's profile data.

With such disparate distribution of information, one may wish to share other person's profile data with yet another person. The following example illustrates such a situation. The two colleagues, Adam and Beatrice, are discussing a project that they are working on together. Adam would like to bring their mutual acquaintance Connor on board. However, Beatrice does not have any contact information for Connor. Adam does and would like to share Connor's profile information with Beatrice. Adam does not know whether Connor might approve of his sharing information with Beatrice or not. In some embodiments, when the first person 202 would like to share with the second person 204 the profile data 208 of the third person 206, the first person 202 can request to the communication system 210 for permission to share the data. After the communication system 210 reviews its policy 212 regarding sharing data and/or receives permission from the third person 206, it may grant permission for the first person 202 to share the third person's 206 profile data 208 with the second person 204. In other embodiments, the second person 204, who is the prospective recipient of the information, can initiate the process by requesting to the communication system 210 permission for the first person 202 to share the third person's 206 profile data 208 with the second permission. After a similar policy 212 review process and/or obtaining permission from the third person 206, the communication system 210 may allow the second person 204 to receive the third person's 206 profile data 208 from the first person 202.

The data sharing policy 212 of the communication system 210 can be stated in terms of a common context value 214. In some embodiments, the common context value 214 generally signifies how close a relationship is among two or more people. In other embodiments, the common context value 214 indicates how strongly the third person 206 is connected to the first person 202. In yet other embodiments, the common context value 214 indicates how strongly the third person 206 is connected to the second person 204. In still yet other embodiments, the common context value 214 indicates how strongly the third person 206 is connected to both the first person 202 and the second person 204.

The communication system 210 can generate the common context value 214 based on the associations between the first person 202 and the second person 204; between the second person 204 and the third person 206; and/or between the first person 202 and the third person 206. For example, a policy 212 may have been established for a communication system 210 where whether the first person 202 may share the third person's 206 profile data 208 with the second person 204 without the third person's 206 express permission is determined by both how much association that the third person 206 has had with the first person 202 and how much association that the third person 206 has had with the second person 204.

The information regarding the associations among the first person 202, the second person 204, and the third person 206 can be obtained by accessing the association data 216. The association data 216 is a collection of any information that may be helpful in determining how close a relationship between two or more given users. The association data 216 can be a database. In some embodiments, the association data 216 is part of the communication system 214. In other embodiments, the association data 216 is a separate entity from the communication system 214, but accessible by the communication system 214.

In some embodiments, the association data 216 includes interaction history 218. The interaction history 218 contains communication threads. A communication thread is a recorded instance of any exchange of information that occurs among two or more users of the communication system 214. For example, a communication thread may be an e-mail message, a phone call, a short-message-service (SMS) text message, a face-to-face conversation, an announcement, a meeting, a conference, a project, a trip, and a social event. In addition, the communication threads may include information about other surrounding circumstances related to such events such as date, time, place, sender, recipient, participants, notes, and other helpful information. As a further illustration, some of the communication threads between Alexis and Brady may include all the e-mail messages that they have exchanged with each other in the past, all the recorded phone conversations that took place between the two people or any written transcriptions of such conversations, any written transcripts of live conversations that took place between the two, any records of meetings that both Alexis and Brady have participated in, any records of business trips that the two have been part of, any company memos or documents where both of their names were referenced, etc., along with all the detailed descriptions of the events such as dates, times, places, participants, etc. In some embodiments, the communication threads can be tagged with people, so that it would be more efficient to sift through the information and find a relevant piece of interaction history.

Depending on the communication system's 210 policy 212, the communication threads can be assigned different weight values according to their types and other factors when calculating the common context value 214, such as how active, recent, specific, etc. a communication thread might be. For example, one policy 212 may dictate that an e-mail correspondence between two users that took place in the last 48 hours is worth 40% more than a phone conversation that took place more than a week ago in terms of how close of a relationship such events tend to suggest. In another example, another policy 212 may assign a higher numerical value, which may indicate a closer relationship, to a sender of an e-mail message, in terms of the closeness of her relationship to the recipient of the message, compared to another co-recipient or a person who was merely CCed in the message, or mentioned in the body of the message. For a more specific example, Adrian sent out an e-mail to two recipients, Bethany and Calvin, and CCed the message to Dieter. According to the exemplary policy set forth above, this particular communication thread will likely indicate that Adrian's relationship with Bethany is closer than both Calvin's and Dieter's relationships with Bethany.

In other embodiments, the association data 216 includes relational metric 218. The relational metric 218 provides a way to measure and quantify known real-life relationships among users in terms of how close those relationships are. In other words, the relational metric 218 provides the information regarding already established relationships that various users of the communication system 210 may be in. The relational metric 218 can take into account familiar relationships (e.g., parent-child, brother-sister), social relationships (e.g., friends, online acquaintances), professional relationships (e.g., supervisor-supervisee, coworkers), civic relationships (e.g., teacher-student, police officer), communal relationships (e.g., neighbors), and any other types of relationships that may affect the information sharing policy 212 of the communication system 210. For example, the first person 202 and the third person 206 may be father and son. In another example, the second person 204 and the third person 206 may be student and teacher. Each relationship that is recorded and stored as part of the association data 216 can inform the communication system 210 when it generates a common context value 214.

In some embodiments, the association data 216 includes both the interaction history 218 and the relational metric 220. In other embodiments, the association data 216 includes either the interaction history 218 or the relational metric 220. In yet other embodiments, the association data 216 includes any other information that may be helpful in calculating the common context value 214 along with any interaction history 218 data or the relational metric 220 data. This information, for example, can include user input, knowledge base, artificial intelligence, access privilege, etc. To give a more specific example, a human resources manager can be given unusually high common context values with everyone else in her company given her vast access privilege as a human resources manager.

Based on the association data 216, the communication system 210 generates one or more common context values 214. In some embodiments, each common context value represents 214 the closeness of relationship between two or more users. For example, the communication system 210 may have three separate common context values 214, one for the relationship between the first person 202 and the second person 204, another one for the relationship between the second person 204 and the third person 206, and yet another one for the relationship between the third person 206 and the first person 202. Each of these common context values can become the bases on which still yet another common context value can be generated. Taking into account all the interactions and preexisting relationships that the three people may have, this value can help predict the likelihood that the third person 206 would allow the first person 202 to share the third person's profile data 208 with the second person 204.

In some embodiments, the common context value 214 can be based on contribution strengths. As an illustration, the contribution strength of C for A when A is interacting with B, represented by $\Gamma_{A,B}(C)$, can indicate how likely that C would be contributing to or involved in a communication thread initiated by A with B. Similarly, $\Gamma_{B,A}(C)$ would indicate how likely that C would be contributing to or involved in a communication thread initiated by B with A. For example, if according to the association data 216 the communication threads such as e-mail, telephone calls that Alex, the supervisor, has initiated in order to communicate with his subordinate, Brett, also included Candice, the project manager, on a number of occasions whereas none of the communications threads that Brett initiated to communicate with Alex included Candice, then $\Gamma_{Alex, Brett}$(Candice) would be a high value while $\Gamma_{Brett, Alex}$(Candice) would be a low value. These values tend to indicate that in similar communication threads in the future, Candice will be more likely to contribute to or be involved in a communication thread when Alex is communicating with Brett, and not so much when Brett is communicating with Alex. In some embodiments, the common context value 214 can be based on $\Gamma_{A,B}(C)$ and/or $\Gamma_{B,A}(C)$, when A is the first person 202, B is the second person 204, and C is the third person 206. For example, the communication system's policy 212 may dictate that the first person 212 may share the third person's profile 208 with the second person 204 when both $\Gamma_{A,B}(C)$ and $\Gamma_{B,A}(C)$ are high (i.e., above a threshold or thresholds). In another example, $\Gamma_{A,B}(C)$ and $\Gamma_{B,A}(C)$ can have two separate thresholds. In yet another example, a third value can be derived from $\Gamma_{A,B}(C)$ and $\Gamma_{B,A}(C)$ through a formula, such as $V=\Gamma_{A,B}(C)\times 0.7+\Gamma_{B,A}(C)\times 0.3$, and the first person 202 is permitted to share the third person's profile data 208 with the second person 204 only when the third value is above a threshold.

In some embodiments, contribution strengths can be computed by using a matrix that represents the activity and contribution strength towards a given communication thread. The rows and columns of this matrix can be the people involved in the communication, and the values of the matrix can represent the contributions of various people that are involved in that thread.

The threshold, against which the common context value 214 is compared, can be adjusted based on how readily available the third person's profile data 208 is. For example, the policy 212 may dictate that if the third person's profile data 208 is publicly available for everyone, then the first person 202 may freely share the data with the second person 204. Alternatively, the policy 212 may be such that the threshold in such a case would be so low that virtually anyone can share the data with anyone else, thereby achieving the same result as above. As a more specific example, Chuck, a CEO of a company, publishes his own contact information including his e-mail address and his cellular phone number on his personal website, which is open for the public to access. Annie already has Chuck's contact information listed on her instant messenger, but Bonnie does not. The instant messenger may allow Annie to share Chuck's profile data with Bonnie regardless of any common context values that might have been generated by the instant messenger.

In some embodiments, even if the common context value(s) 214 are not above the threshold, the communication system 210 can still give permission to the first person 202 to share the third person's profile data 208 with the second person 204, as long as the third person 206 expressly grants permission for the first person 202 to share the data. Specifically, when the communication system 210 determines that the common context value 214 is not above the threshold, the communication can send a request to the third person 206 for approval of the data sharing. Upon the third person's 206 express approval, the communication system may then grant permission to the first person 202 to share the third person's profile data 208 with the second person 204. For example, Alison would like to share Celine's profile picture with Belma, but neither Alison nor Belma has interacted with Celine extensively in the past, and neither has established a relationship with Celine yet. Belma sends a request to the communication system to approve Alison's sharing data with Belma. However, the communication system denies the request on the basis of Alison and Belma's interaction with Celine. The communication system then sends a request to Celine to approve Alison and Belma's data exchange, and Celine gives her permission. Based on this express permission, the communication system allows Alison to share Celine's data with Belma.

Alternatively, the third person's 206 express permission can be given, in advance, to the first person 202 or the second person 204, and when the first person 202 or the second person 204 requests permission from the communication system 210 to share the profile data 208, the communication system 210 can grant permission to the requestor to share data based on the third person's 206 pre-approval, regardless of the value of the common context value 214 that it may generate. The third person's 206 pre-approval can be presented to the communication system in the form of a message, a digital token, an encrypted message, code, etc. Revisiting the illustration above, before approaching the communication system, Alison, can instead contact Celine in person and ask for permission to share Celine's photo with Belma. If Celine approves, then Alison can presents the message of approval that she received from Celine to the communication system and ask for permission to share data. The communication system would then allow Alison to share Celine's data with Belma.

When the third person 206 gives her express permission to share data, she can also make a suggestion or impose a restriction as to which data to share and which data to not share. For instance, when asked for permission to share a photo with Belma, Celine may reject the photo that Alison was going to share with Belma, but instead suggest one of her own pictures for Alison to share with Belma. The third person 206 can also help the communication system 210 improve its association data 216 and/or refine its sharing policy 212 by pointing out which communication thread was relevant in making her decision. For example, on top of granting permission to the communication system, Celine can also indicate to the communication system that she remembers corresponding with Belma through e-mail and which particular e-mail message was relevant in her granting permission. In general, any of the third person's 206 input can be used to help improve the association data 216 and/or the sharing policy 212.

If the communication system 210 finds that the common context value is above a threshold, or has received the third person's 206 permission to share her profile data 208, the communication system 210 can permit the first person 202 to share the third person's profile data 208 with the second person 204. The expression, "above a threshold" here, however, does not strictly mean that a certain value should be higher than another value. To the contrary, it is used in the general sense of the expression, which is to meet a certain condition. The person of skill in the art will understand that such threshold conditions can be met by evaluating whether a value is greater than the threshold value, greater than or equal to the threshold value, less than the threshold value, less than or equal to the threshold value, etc. Once given permission, the first person 202 can share the profile data 208 with the second person 204 in a number of ways. In some embodiments, the first person 202 can share the profile data 208 with the second person 204 through the communication system 210. In other words, the communication system 210 delivers the data to the second person 204 at the request of the first person 202. In other embodiments, the profile data 208 resides inside the communication system 210 and continues to remain there, but now both the first person 202 and the second person 204 can freely access the third person's profile data 208, whereas, before, only the first person 202 could access the data. In yet other embodiments, after receiving permission from the communication system 210 to share the data, the first person 202 simply shares the profile data 208 with the third person 204 without the intervention of the communication system 210. The communication system 210 can fine-tune its permission as to which particular piece of profile data 208 that the first person 202 may share with the second person 204. In other words, instead of granting blanket permission, the communication system 210 can specify which data that the first person 202 is allows to share with the second person 204. This decision can be based on the content of the association data 216. For example, the communication system 210 can allow sharing of only the pictures that are included in the active communication threads such as e-mail between the first person 202 and the third person 206. Under this exemplary rule, Audrey, who is currently having an active text message conversation with Chandler, can only share with Brittany a photo that Audrey received from Chandler during that text message communication, but not other photos of Chandler that Audrey may already own. The communication system's policy 212 can contain other rules to selectively allow or disallow certain types of information to be shared.

Figure 3:
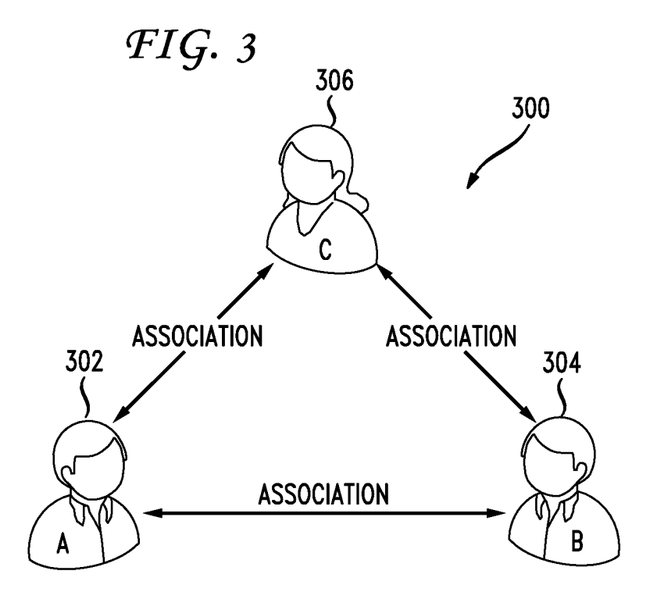
FIG. 3 illustrates an exemplary association map among three parties.

FIG. 3 illustrates an exemplary association map among three parties. The first person 302 wishes to share some information pertaining to the third person 306 with the second person 304. The sharing of the information can happen without the knowledge of or expression permission from the third person 306. The third person 306 can be a common contact of both the first person 302 and the second person 304. Alternatively, only the first person 202 or only the second person 204 may have had previous contact with the third person 206. As another alternative, neither the first person 302 nor the second person 304 may have had personal interaction with the third person 306 in the past.

The first person 302, the second person 304, and the third person 306 may have a level of association amongst each other. Such association may have stemmed from an existing relationship or their past interactions. For example, the first person 302 may be a security guard at the building that the second person 304 works in. For another example, the second person 304 may be the first person's 302 boss and the manager of the building where the third person 306 works. For yet another example, the second person 304 may have had a brief conversation with the third person 306 and sent him an e-mail message with the first person 302 included in a CC.

From such relationships and interactions, a contribution strength score or a connection strength score can be calculated. The contribution strength indicates how much one individual contributes to an interaction between two other individuals. For instance, the third person's contribution strength score for the first person's 302 interactions with the second person 304 can depend, at least partially, on how many times the third person 306 is mentioned or referenced in the first person's 302 e-mail messages to the second person, how many times the third person 306 has participated in conference calls with either of the two, how many projects the third person 306 has been involved in with either of the two, etc. Such a score can be used when determining how close a relationship is the third person 306 in with either the first person 302 or the second person 304. Such knowledge can be useful when predicting whether the third person 306 would be likely to let the first person 302 or the second person 304 share between each other any information they might have about the third person 306.

Figure 4:
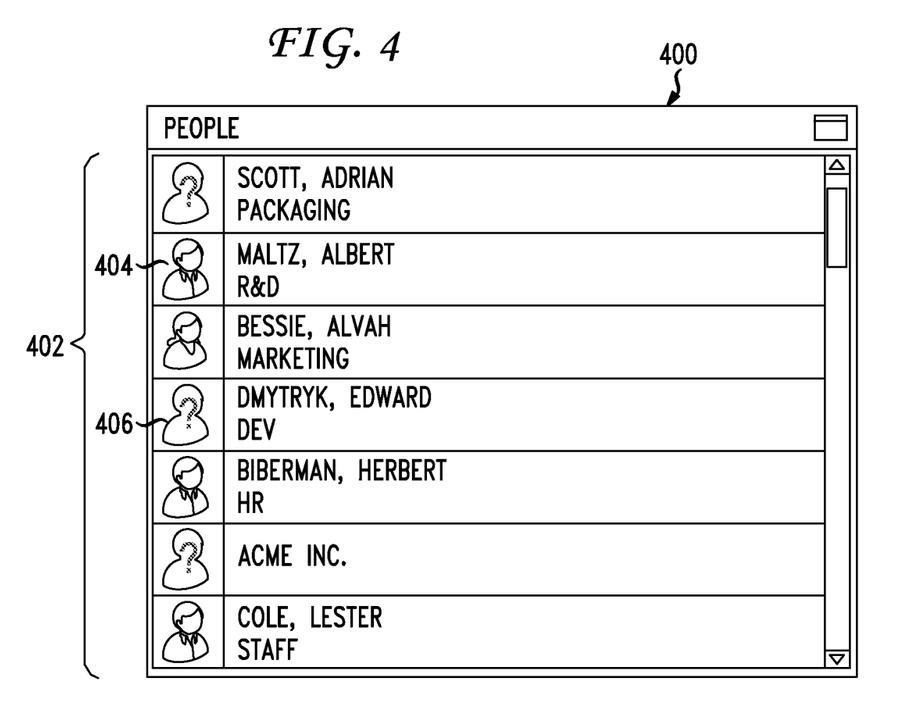
FIG. 4 illustrates an exemplary communication system.

FIG. 4 illustrates an exemplary communication system. The system has a list of contacts 400 that a user can access in order to access information about or initiate an interaction with another user. The list 400 can be populated with the profile data the communication system has on each of its users 402 and how much of such data is available to the user for access. Some data can be incomplete. For instance, if a profile picture is not available for one or more users, a generic placeholder image 406 may be displayed in lieu of a real photo image of the user 404. Other pieces of data such as name, department, e-mail address, telephone number, and address can be also missing. Alternatively, the list 400 can be populated with any profile data that the communication system may have, but also supplemented by the data that the user of the communication system may have provided. For example, a user named Albert Maltz may not have registered his profile picture with the communication system. In such case, his picture would normally not show up next to his name on the list of contacts 400 for other users. However, another user Samuel Ornitz owns a picture of Albert Maltz 404 that he took with his camera and decides to use the picture with the communication system. Now, Samuel Ornitz's contact list 400 will display Albert Maltz's picture 404 that Samuel Ornitz has provided. The picture may or may not be uploaded to the communication system.

In another example, Samuel Ornitz realizes that he does not have a profile picture of Edward Dmytryk, a software developer, nor is Dmytryk's image registered with the communication system. Thus, Dmytryk shows up on the contact list 400 with a placeholder image 406. Ornitz finds out that his friend in the HR Department, Herbert Biberman has access to a couple of pictures of Dmytryk, an official employee photo and a picture that Biberman took of Dmytryk at a company social event and has shared only with the employees that were depicted in the photo. Ornitz sends a request to the communication system to allow Biberman to share his pictures of Dmytryk with Ornitz. Although Biberman has rarely interacted with Dmytryk except through a few HR-related business e-mail messages, Ornitz has worked together with Dmytryk on a few projects, and has traveled with Dmytryk to attend a conference. The communication system determines that Dmytryk's relationships to Biberman and Ornitz are within the guidelines of its profile data sharing policy and allows Biberman to share the official employee photo with Ornitz. However, the communication system deems that the social photo cannot be shared because, among other things, it had been shared with only a selected few employees in the past and Ornitz was not one of them. Therefore, it is against the communication system's privacy protection policy to allow Biberman to share the photo with Ornitz. Biberman, however, thinks that the social photo looks innocuous and that Dmytryk looks better in the social photo anyways. Biberman requests to the communication system to ask permission from Dmytryk, and Dmytryk receives a notification from the communication system asking for his permission to allow the photo sharing. Dmytryk examines the social photo, but decides that he would rather share a different photo of himself. Dmytryk provides the communication system with the new photo, and the communication system sends the new photo to Ornitz as well as allowing Biberman to share the official photo with Ornitz. This example is given in the context of sharing profile photos, but those of skill in the art will understand that similar techniques can be used to share other types of profile data such as names, titles, positions, phone numbers, addresses, e-mail addresses, identification numbers, and so forth.

Figure 5:
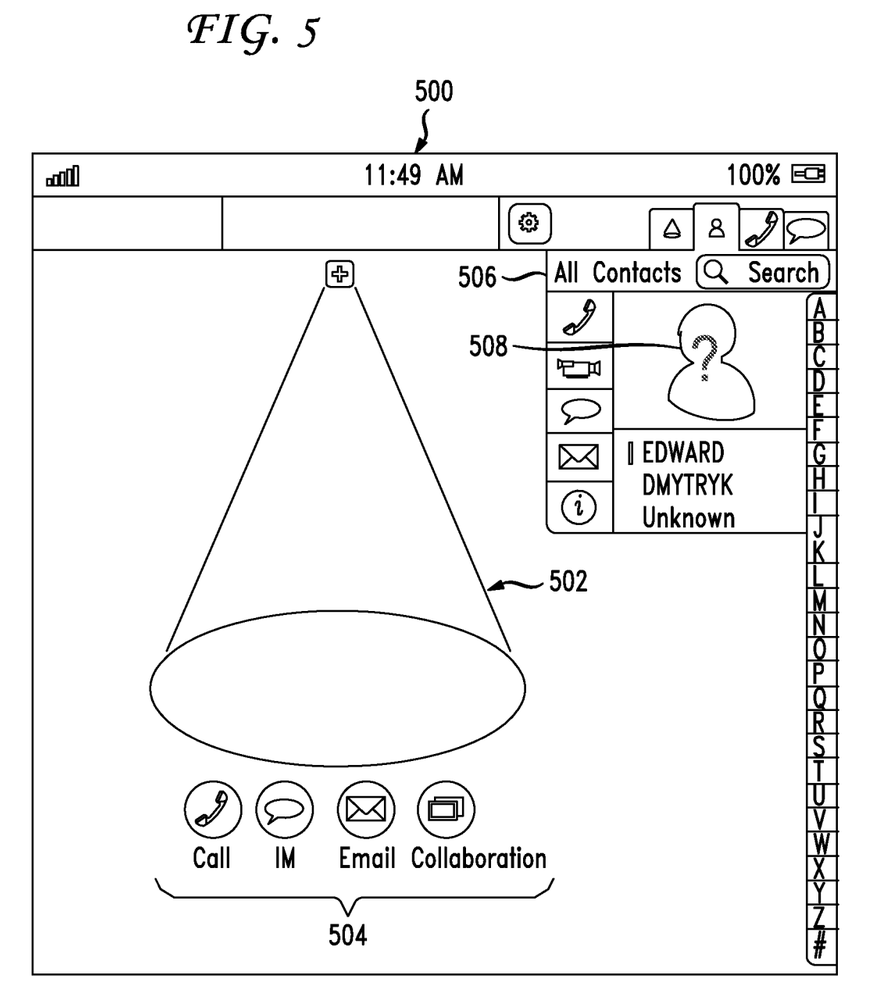
FIG. 5 illustrates another exemplary communication system.

FIG. 5 illustrates another exemplary communication system, which is a web-based teleconferencing platform 500. The user may browse through his contact list 506 and choose with whom he would like to communicate. Each contact is associated with an avatar, or a digital representation of the person. The avatar can be a photorealistic image such as a photograph or can be in other forms of representation such as a drawing, a symbol, an icon, text, an animation, etc. If an avatar is not available for a user, then her avatar can be replaced by a placeholder image 508, which indicates that the avatar is not available for use. Once the user chooses which person(s) to communicate with, he can use the on-screen control 504 to initiate a communication session such as a phone call, an instant message, an e-mail, or a collaboration. Once the communication session starts, the avatars of the people that he is interacting with show up in the staging area 504 of the user interface to provide visual representations of the people that he is communicating with. Such technique can enhance the experience of communicating with people that are in remote locations. However, such experience can be compromised if one or more avatars are not available and the contacts are displayed with generic placeholder images. The user may not have pictures or avatars of the missing contacts that he can provide to the teleconferencing platform 500. In such a situation, the user can ask the teleconferencing platform 500 whether some other user, who may have the missing images, can share their images with him. The teleconferencing platform 500 can grant permission based on the common context value that it has generated.

Figure 6:
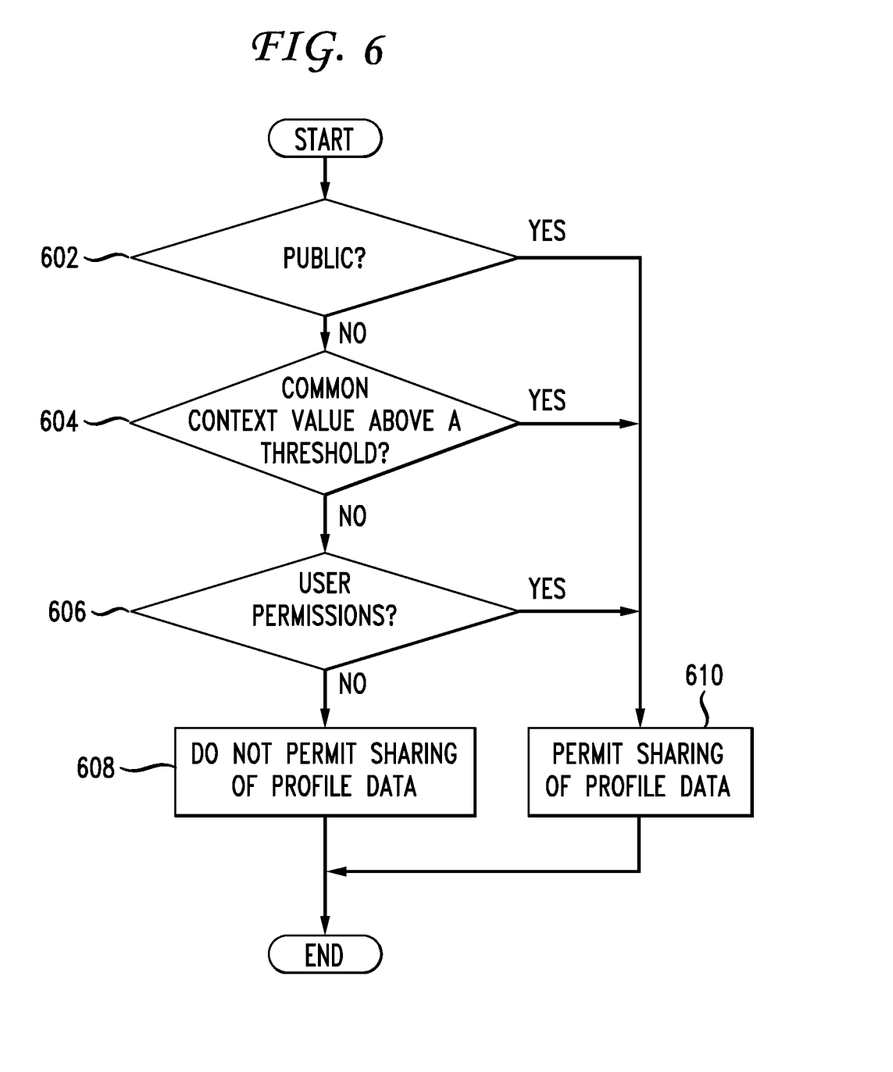
FIG. 6 illustrates an exemplary decision tree for authorizing profile data sharing.

FIG. 6 illustrates an exemplary decision tree for sharing profile data. For the sake of clarity, the method is described in terms of an exemplary system 100 as shown in FIG. 1 configured to practice the method. This decision tree 600 is one of many possible embodiments, and the steps therein do not have to occur in the same order as suggested in FIG. 6. The decision tree 600 can be part of the profile data sharing policy 212 as depicted in FIG. 2. First, the system 100 determines if a piece of profile data to be shared is publicly available (602). For instance, the system 100 can determine whether the data can be accessed by anyone with Internet access such as when the data has a publicly accessible URL address. Alternatively, the system 100 determines if a piece of profile data to be shared is widely available. For instance, even if the data access is open to the general public, the system 100 may nevertheless determine that the data is sufficiently widely available according to its policy when the data can be accessed by every employee of the company. In either case, if the data to be shared is publicly available or widely available, the system 100 permits sharing of the profile data (610). The various means of determining whether profile data is publicly or widely available are known to those of skill in the art. For example, it can be determined by examining the URL, examining the sharing history of the data, comparing other users' access privilege to the data, searching the Internet for the data's availability, etc.

If, however, the data is in fact only available to a small audience, the system 100 moves on to determine whether the common context value is above a threshold (604). The term "small" here is a relative term and is based on the profile data sharing policy 212. In some embodiments, the common context value measures how close a relationship is among two or more people. In other embodiments, the common context value indicates how, in a three-person relationship such as illustrated in FIG. 3, strongly the third person 306 is connected to the first person 302. In yet other embodiments, the common context value indicates how strongly the third person 306 is connected to the second person 304. In still yet other embodiments, the common context value indicates how strongly the third person 306 is connected to both the first person 302 and the second person 304. The common context value can be generated based on the associations among the three people. The associations can be based on the interaction history and/or previously established known relationships among the involved parties. The system 100 determines whether the common context value is above a threshold or not, and if the value is above the threshold, permit the profile data sharing (610). If not, then move on to the next step. The expression, "above a threshold" here is used in the general sense of the expression, which is to satisfy a threshold condition, and does not strictly mean that the common context value should be higher than the threshold value. Those of skill in the art will understand that such threshold conditions can be met by evaluating whether a value is greater than the threshold value, greater than or equal to the threshold value, less than the threshold value, less than or equal to the threshold value, etc.

Next, the system 100 determines whether express user permission is given to allow sharing of the profile data (606). In some embodiments, the person who gives permission can be the individual whom the profile data is of. In other embodiments, the person who gives permission can be the current owner of the profile data. In yet other embodiments, the person who gives permission can be a previous owner of the profile data. When there are multiple potential people that the system 100 is required to receive permission from, the system 100 can have a policy chain of profile data sharing, where the system 100 tries to obtain permission from one person after another up the chain until any or all of them (depending on the policy) assent to the proposed data sharing. For example, Alan does not have Chen's e-mail address and would like to obtain the address. Alan finds out that Brian, whom he is not personally acquainted with, has Chen's e-mail address. Alan requests to the communication system to allow Brian to share Chen's e-mail address with Alan. The communication system's profile data sharing policy states that if the profile owner cannot be reached for approval, permission should be obtained from the current owner (i.e., the person who will be sharing the data) and all the previous owners of the data. The communication system asks Brian's permission and Brian assents. It turns out that Brian got Chen's e-mail address from Donald. The communication system asks Donald's permission to share the data and Donald assents. Donald received the e-mail address from Ethel, who received the e-mail address from Chen himself. The communication system successfully obtains permission from Ethel. The communication system can now authorize Brian to give out Chen's e-mail address to Alan.

Other permission policies can be contemplated as well. For instance, the system 100 can allow data sharing as long as the two most recent owners of the data approves of the sharing. As another example, the system 100 can allow the data sharing as the "ownership chain" is not more than three-person deep. If the system 100 obtains all the necessary user permissions in accordance with its profile data sharing policy, the system 100 grants permission to share the profile data (610). Otherwise, the system 100 does not permit sharing of the profile data (608). The permission to share the profile data can be conditional or incomplete. For instance, the system 100 may permit sharing of e-mail address but not home address; e-mail address but not phone number; official company profile picture but not privately obtained picture, etc.

The exemplary decision tree 600 is merely illustrative and a person of skill in the art can contemplate other decision trees that are similar to the exemplary decision tree 600 according to the needs of the system 100 and its users. For example, the various decision steps can occur in any order. Specifically, one can contemplate a system 100 that determines whether the common context value is above a threshold (604) first, attempts to obtain necessary user permissions (606) second, and then determine whether the profile data to be shared is public information (602) last. As another example, the various decision steps can be conjunctive rather than disjunctive, or can be a combination of both. As a specific example, the permission to share profile data may be given only when all three conditions—the data is publicly available (602), the common context value is above a threshold (604), and the user permissions are obtained (606) —are satisfied, rather than when any one of the conditions is met. It can also be contemplated that the system 100 may require that (a) both the public availability (602) and the common context value (604) requirements are met, or simply (b) all the user permissions are obtained (606). The sharing policy can contain only one or two of the steps illustrated in the exemplary decision tree 600 or other steps not illustrated in the exemplary decision tree 600. For example, the policy can have other requirements such as payment of fee, administrator approval, agreement to terms and conditions, agreement to privacy policy, etc.

Figure 7:
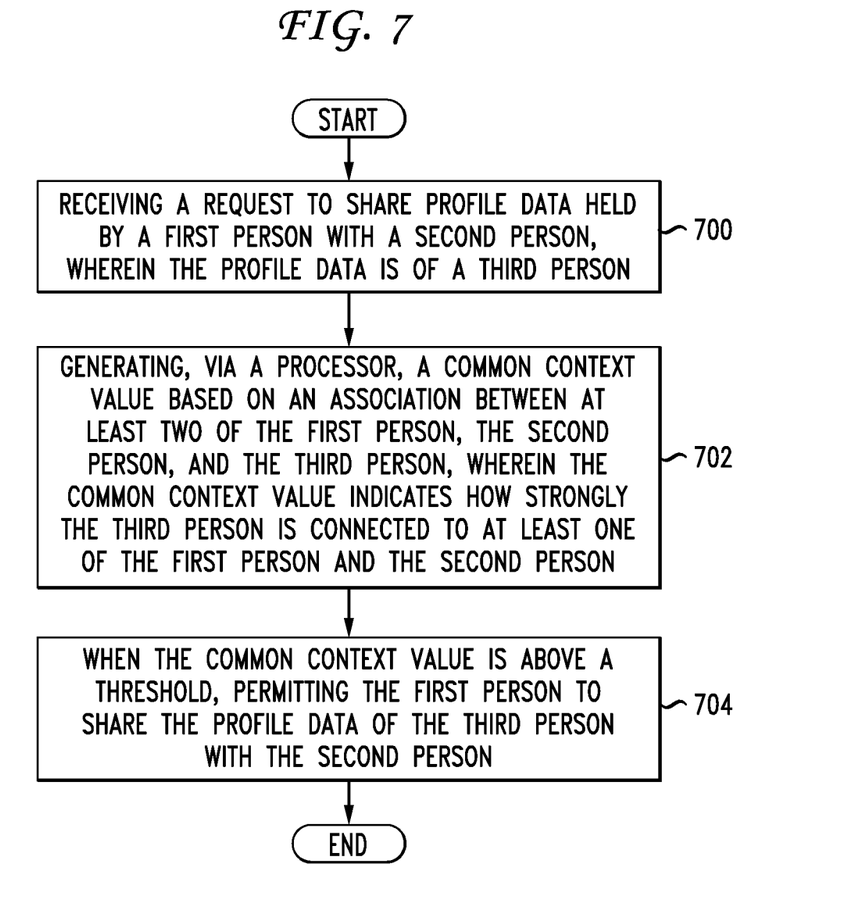
FIG. 7 illustrates an example method embodiment.

Having disclosed some basic system components and concepts, the disclosure now turns to the exemplary method embodiment shown in FIG. 7. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps. First, the system 100 receives a request to share profile data held by a first person with a second person, wherein the profile data is of a third person (700). The profile data can include a name, a nickname, a title, a phone number, an address, an e-mail address, a photograph, an avatar, a date of birth, a username, an identification number, etc. In one embodiment, the request to share the profile data comes from the first person. In another embodiment, the request comes from the second person.

Next, the system 100 generates, via a processor, a common context value based on an association between at least two of the first person, the second person, and the third person, wherein the common context value indicates how strongly the third person is connected to at least one of the first person and the second person (702). The association can be an interaction history, which is based on communication threads. A communication thread can be an e-mail message, a phone call, a face-to-face conversation, an announcement, a meeting, a conference, a project, a trip, a social event, or any interaction between two people. For example, between Alice and Bob, any e-mail correspondence, every phone conversation, every recorded live conversation, every joint project, etc. will form an interaction history between the two individuals. The association can also be a relational metric. The relational metric can be based on a familial relationship, a social relationship, a professional relationship, a civic relationship, a communal relationship, and/or any other relationship. Such relationships are evaluated and quantified to produce a numerical value so that the common context value can be generated. In some embodiments, whether the profile data to be shared is publicly or widely available can be taken into account when generating the common context value. In other embodiments, the threshold can be adjusted according to public availability of the profile data to be shared. For example, if the profile data is easily obtainable through other means than by obtaining through the system 100 or its users, then the threshold can be lowered so that the data can be freely exchanged among the users.

The system 100 can also receive the third person's permission for the first person to share the profile data with the second person, and authorize the first person to share the profile data of the third person with the second person, even when the common context value is not above the threshold. Sometimes, the system 100 may not have a sufficient amount of reliable interaction history and/or relational metric data to adequately evaluate the relationships among the three parties. In such cases, obtaining express permission from the third person assures that the data sharing is properly authorized without having to second-guess based on unreliable data. Alternatively, the permission can be obtained from other individuals than the third person, such as the previous owners of the profile data. Such permissions can be obtained directly from the individuals that are granting permissions, or obtained from the person who requested permission to share profile data and had already obtained pre-approvals to do so.

Finally, when the common context value is above a threshold, the system 100 permits the second person to share the profile data of the first person with the third person (704). The expression, "above a threshold" is used in the general sense of the expression, which is to meet a certain condition. The threshold condition, therefore, can be satisfied when the common context value is greater than the threshold value, greater than or equal to the threshold value, less than the threshold value, less than or equal to the threshold value, etc.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to such wide variety of communication platforms as a cellular phone, a smartphone, a computer, an instant messenger, voice over IP (VoIP), a video chat/conferencing system, a teleconferencing system, an e-mail service, a social media service, a web-based remote conferencing service, etc. Various modifications and changes may be made to the principles described herein without following the example embodiments and applications illustrated and described herein, and without departing from the spirit and scope of the disclosure.

We claim:

1. A method, comprising:
   receiving, by a processor, a request from a computing device of a first user to provide a second computing device of a second user with access to profile data of a third user, wherein the third user is different than the first and second users, and wherein the first user already has access to the profile data of the third user;
   generating, by the processor, a common context value based only on an association between the first user and the third user, wherein the common context value indicates a connection strength between the first user and the third user;
   comparing, by the processor, the common context value to a threshold;
   determining, by the processor, that the common context value being below the threshold;
   in response to the common context value being below the threshold, sending, by the processor, a request to the third user for approval to share the profile data of the third user;
   receiving, by the processor, permission from the third user for the first user to share the profile data with the second user after determining that the common context value is below the threshold; and
   permitting, by the processor, the first user to share the profile data of the third user with the second user even when the common context value is below the threshold.

2. The method of claim 1, wherein the threshold is adjusted according to public availability of the profile data at another location.

3. A method, comprising:
   receiving, by a processor, a request from a computing device of a first user to provide a second computing device of a second user with access to profile data of a third user, wherein the third user is different than the first and second users, and wherein the first user already has access to the profile data of the third user;
   generating, by the processor, a common context value based only on an association between the first user and the third user, wherein the common context value indicates a connection strength between the first user and the third user;
   comparing, by the processor, the common context value to a threshold; and
   in response to the common context value being above the threshold permitting, by the processor, the computing device of the first user to provide the computing device of the second user with access to the profile data of the third user,
   wherein the common context value is based on an email and wherein the common context value is different based whether at least two of the first user, the second user, and the third user are mentioned in a communication thread in a body of the email and/or are Carbon Copied (CCed) in the email, and wherein the communication thread is a recorded exchange of information occurring between the at least two of the first user, the second user, and the third user.

4. A method, comprising:
   receiving, by a processor, a request from a computing device of a first user to provide a second computing device of a second user with access to profile data of a third user, wherein the third user is different than the first and second users, and wherein the first user already has access to the profile data of the third user;
   generating, by the processor, a common context value based only on an association between the first user and the third user, wherein the common context value indicates a connection strength between the first user and the third user;
   comparing, by the processor, the common context value to a threshold; and
   in response to the common context value being above the threshold, permitting, by the processor, the computing device of the first user to provide the computing device of the second user with access to the profile data of the third user,
   wherein permitting the first user to provide the second user with access to the profile data of the third user is based on approval from one or more previous owners of the profile data of the third user, and wherein the one or more previous owners of the profile data of the third user is not one of the first user, the second user, or the third user.

5. The method of claim 4, wherein the one or more previous owners comprises a plurality of owners in an ownership chain.

6. The method of claim 4, wherein approval from the one or more previous owners of the profile data of the third user is based on any one of the one or more previous owners.

7. The method of claim 4, wherein approval from the one or more previous owners of the profile data of the third user is based on each of the one or more previous owners.

8. The method of claim 4, wherein approval from the one or more previous owners of the profile data of the third user is based on a most recent previous owner of the one or more previous owners.

9. The method of claim 5, wherein the ownership chain is no more than three previous owners.

10. The method of claim 4, wherein the profile data comprises at least one of a name, a nickname, a title, a phone number, an address, an e-mail address, a photograph, an avatar, a date of birth, a username, and an identification number.

11. The method of claim 1, further comprising in response to sending, by the processor, the request to the third user for approval to share the profile data of the third user, receiving, by the processor, a rejection by the third user for permission to share the profile data with the second user and an offer to share other profile data with the second user.

12. The method of claim 1, wherein the profile data comprises at least one of a name, a nickname, a title, a phone number, an address, an e-mail address, a photograph, an avatar, a date of birth, a username, and an identification number.

13. The method of claim 1, wherein the association comprises an interaction history, wherein the interaction history is based on a plurality of communication threads.

14. The method of claim 13, wherein the plurality of communication threads comprises at least one of an e-mail message, a phone call, a face-to-face conversation, an announcement, a meeting, a conference, a project, a trip, and a social event.

15. The method of claim 1, wherein the association comprises a relational metric, the relational metric being based on at least one of a familial relationship, a social relationship, a professional relationship, a civic relationship, and a communal relationship.

16. The method of claim 3, wherein the profile data comprises at least one of a name, a nickname, a title, a phone number, an address, an e-mail address, a photograph, an avatar, a date of birth, a username, and an identification number.

17. The method of claim 3, wherein the association comprises an interaction history, wherein the interaction history is based on a plurality of communication threads.

18. The method of claim 3, Wherein the association comprises a relational metric, the relational metric being based on at least one of a familial relationship, a social relationship, a professional relationship, a civic relationship, and a communal relationship.

19. The method of claim 3, wherein the threshold is adjusted according to public availability of the profile data to be shared.

20. The method of claim 3, further comprising permitting the first user to share the profile data of the third user with the second user even when the common context value is below the threshold based on the third user giving pre-approval.

* * * * *

UNITED STATES PATENT AND TRADEMARK OFFICE
CERTIFICATE OF CORRECTION

PATENT NO. : 11,212,362 B2
APPLICATION NO. : 13/728531
DATED : December 28, 2021
INVENTOR(S) : Krishna Kishore Dhara, Veenkatesh Krishnaswamy and Xiaotao Wu It is certified that error appears in the above-identified patent and that said Letters Patent is hereby corrected as shown below:

In the Claims

At Column 20, Line 14, please delete "Wherein" and insert --wherein-- therein.

Signed and Sealed this
Seventeenth Day of May, 2022

Katherine Kelly Vidal
*Director of the United States Patent and Trademark Office*